US005396224A

United States Patent [19]

Dukes et al.

[11] Patent Number: 5,396,224

[45] Date of Patent: Mar. 7, 1995

[54] TELEMETERED PATIENT LOCATION SYSTEM AND METHOD

[75] Inventors: John N. Dukes, Los Altos Hills, Calif.; J. Evan Deardorff, Bedford; James L. Miller, Westford, both of Mass.

[73] Assignee: Hewlett-Packard Company, Palo Alto, Calif.

[21] Appl. No.: 796,483

[22] Filed: Nov. 22, 1991

[51] Int. Cl.[6] .................................... H04B 7/00

[52] U.S. Cl. .................... 340/825.49; 340/825.72; 340/825.73; 340/539; 340/573; 455/53.1; 455/100; 455/226.2

[58] Field of Search .................... 340/825.49, 825.44, 340/825.69, 825.72, 825.73, 573, 539, 286.06, 286.07, 825.17, 825.06; 455/33.1, 67.1, 67.7, 227, 38.1, 38.4, 53.1, 54.1, 100, 103, 226.2; 342/42, 50; 343/718, 720, 893, 894

[56] References Cited

U.S. PATENT DOCUMENTS

| | | | |
|---|---|---|---|
| 3,439,320 | 4/1969 | Ward | 340/825.49 |
| 3,478,344 | 11/1969 | Schwitzgebel et al. | 340/825.44 |
| 4,225,953 | 9/1980 | Simon et al. | 340/825.49 |
| 4,275,385 | 6/1981 | White | 340/825.49 |
| 4,384,288 | 5/1983 | Walton | 340/825.34 |
| 4,598,275 | 7/1986 | Ross et al. | 340/573 |
| 4,990,892 | 2/1991 | Guest et al. | 340/825.49 |
| 4,998,095 | 3/1991 | Shields | 340/825.49 |
| 5,062,151 | 10/1991 | Shipley | 340/825.49 |
| 5,115,224 | 5/1992 | Kostusiak et al. | 340/825.49 |
| 5,153,584 | 10/1992 | Engira | 340/825.49 |

*Primary Examiner*—John K. Peng

*Assistant Examiner*—Andy Hill

[57] ABSTRACT

A system and method for locating patients in a hospital using M different frequency patient transmitters and N fixed location antennas within the hospital for receiving the patient signals. The received signals for each antenna are separated from the signals received by the other N-1 antennas, and the signal strength of each signal received by each antenna is measured. The received signal strength of each antenna is processed to determine which of the antennas received the strongest signals from each of the patient transmitters. Alternatively, the approximate location within the hospital of each operating patient transmitter is determined since the antennas are in fixed locations and the layout out of the hospital is known. In other embodiments, each of the antennas have a different modulation pattern to enable identification of which of the antennas receives which signals from the patient transmitters. The M signals received by the N antennas are separated by the frequencies of the patient transmitters with each of the separated signals being a composite signal having a single frequency and modulation components from each of the N antennas. Then the signal strength of each of the separated signals is measured, and the relative contribution to the measured signal strength from each of the N antennas is determined. Finally, the relative contribution information for each patient transmitter frequency from each antenna is processed to determine which of the antennas received the strongest signals from each of the patient transmitters to locate the patient relative to particular antennas.

14 Claims, 8 Drawing Sheets

TELEMETERED PATIENT LOCATION SYSTEM AND METHOD

FIELD OF THE INVENTION

The present invention relates to the monitoring of patients in a hospital setting by means of telemetry; more specifically it relates to a patient locator system utilizing telemetry.

BACKGROUND OF THE INVENTION

For some time hospital patients have been remotely monitored for many conditions. One of the most common is remote ECG monitoring. These monitoring systems operate with transmitters, each at a different frequency, being attached to the patient to transmit the desired signals to a nurse's station via a permanently installed system of antennas within at least the section of the hospital where the monitored patients are located. With each transmitter operating at a different frequency, the signals from each of the antennas are simply added together for transmission to the nurse's station. The console at the nurse's station then isolates one signal from another by frequency, and is able to monitor each patient's ECG or other signal simultaneously.

Since the prior art systems add the signal from each antenna to the signal from each other antenna for transmission, they lack the ability to identify the location of the patient. Thus, the patients that are being monitored are asked to remain within a particular region of the hospital so that they can receive immediate assistance if a distress signal is received at the nurse's station.

Human nature being what it is, coupled with the fact that many of these patients are confined to the hospital for long periods of time, patients often roam outside the area where they are told to stay. They proceed through the halls of the hospital, many of them pulling their wheeled IV racks along with them. If an emergency situation arises when the patient is outside the monitoring area, the monitoring nurse's station may receive a distress signal from the transmitter attached to the patient and not be able to locate the patient.

In at least one recent situation there was a patient who was transferred from one hospital to another with the first hospital's transmitter still attached to him. When a distress signal was received from that patient in the second hospital they were not able to immediately locate the patient. It was only after many hours that they were able to find the patient by sequentially and systematically turning off sections of the hospital's telemetry antenna system and listening for a signal from the patient's transmitter.

It would be desirable to have a patient locating system that could rapidly identify the approximate location of each monitored patient. A system that is also compatible with the remote monitoring of ECG, or another function, of a number of patients would be even more desirable. Yet more desirable would be a system that could be implemented by retrofitting existing hospital telemetry monitoring systems that can be used to locate a monitored patient. The various embodiments of the present invention are believed to offer systems with each of these advantages.

SUMMARY OF THE INVENTION

In accordance with the preferred embodiments of the present invention several embodiments of the method and apparatus of the present invention are disclosed. Several of those embodiments are directed to apparatus and method for locating a patient in a hospital using M patient transmitters each operable at a different frequency and N antennas each at a different fixed location within the hospital for receiving the signals from said patient transmitters. The signals received by each of the N antennas are separated from the signals received by each of the other of the N antennas, and the signal strength of each patient transmitter signal received by each of the N antennas is measured. Then the received signal strength of each signal received by each of the N antennas is processed, without loss of identity of the antenna that received the signal, to determine which of the N antennas received the strongest signals from each of the M patient transmitters.

Alternatively, the final step can determine the approximate location within the hospital of each operating patient transmitter and the patient to which it is attached since the antennas are in fixed locations and the layout out of the hospital is fixed and known relative to the antennas positions.

Another group of embodiments of the present invention are directed to apparatus and method for locating a patient in a hospital using M patient transmitters each operable at a different frequency and N antennas each at a different fixed location within the hospital for receiving the signals from said patient transmitters with the signals received by each antenna being modulated by a different modulation pattern to enable identification of which of said antennas receive which signals from the M patient transmitters. In these embodiments the M signals received by the N antennas from the M patient transmitters are separated by frequencies of the patient transmitters with each of the separated signals being a composite signal having a single frequency from each of said N antennas with each component from each of the antennas. Then the signal strength of each of the separated signals are measured, and the relative contribution to the measured signal strength from each of the N antennas is determined. Finally, in these embodiments, the relative contribution information for each patient transmitter frequency from each antenna is processed to determine which of the N antennas received the strongest signals from each of the M patient transmitters.

FIG. *2a* is a schematic representation of a first embodiment of the patient location system of the present invention.

FIG. *2b* is schematic representation of a modification of the first embodiment of the present invention as shown in FIG. *2a*.

FIG. *3a* is a schematic representation of a second embodiment of the patient location system of the present invention.

FIG. *3b* is a schematic representation of a third embodiment of the patient location system of the present invention.

Figure 4:
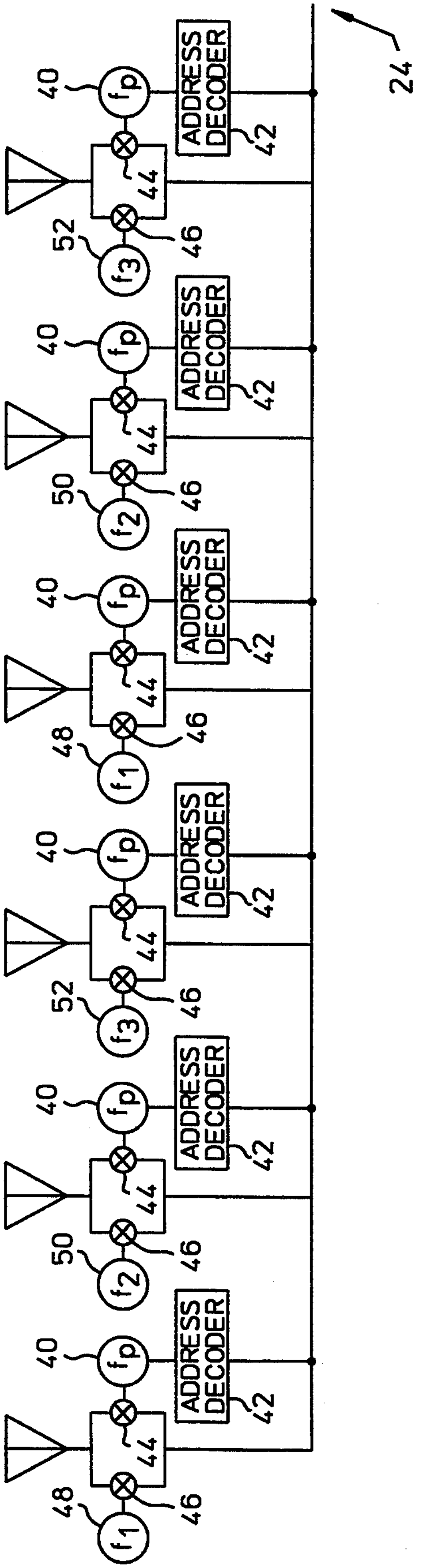

FIG. 4 is a schematic representation of a fourth embodiment of the patient location system of the present invention.

Figure 5:
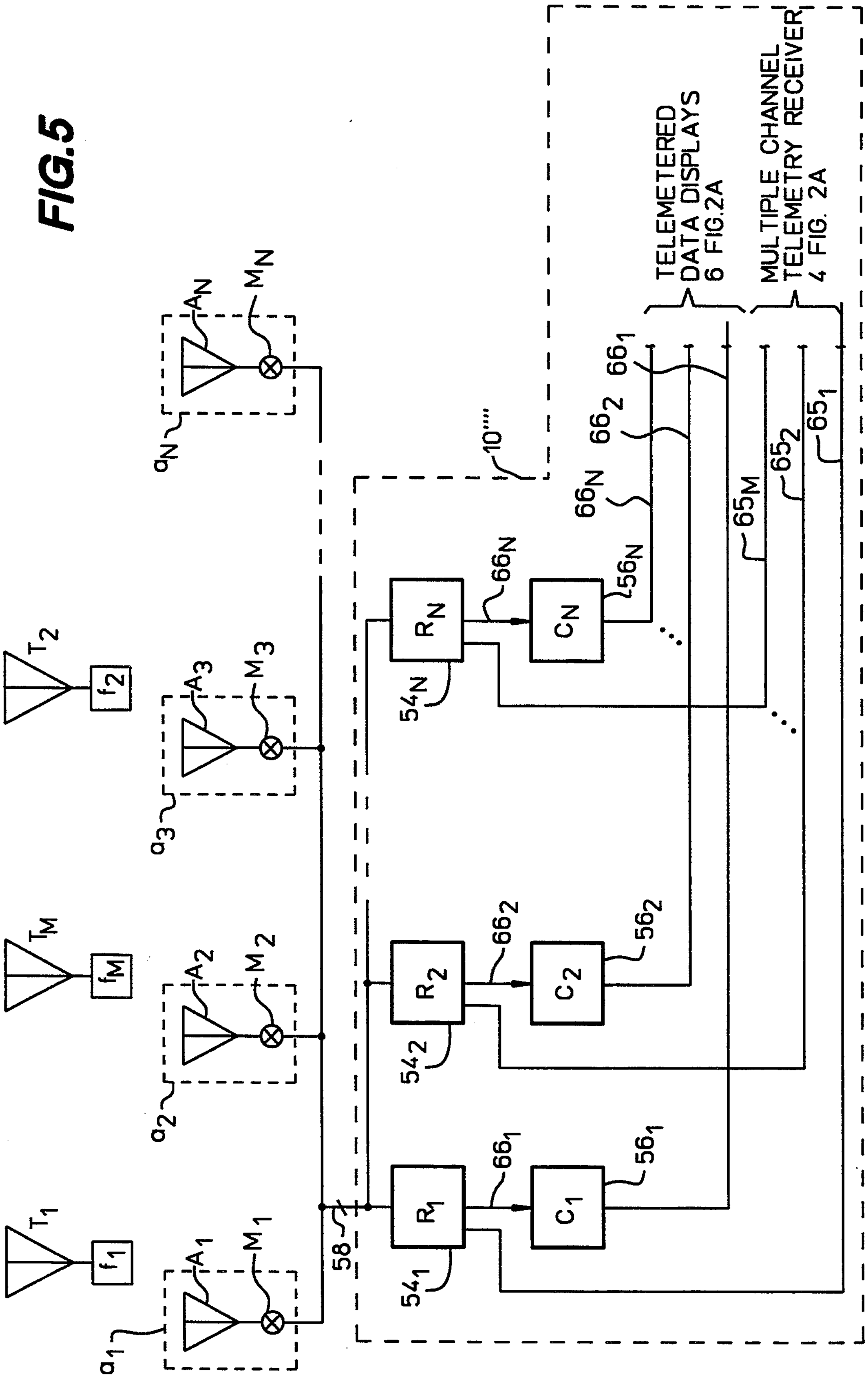

FIG. 5 is a schematic representation of a fifth embodiment of the patient location system of the present invention.

Figure 6:
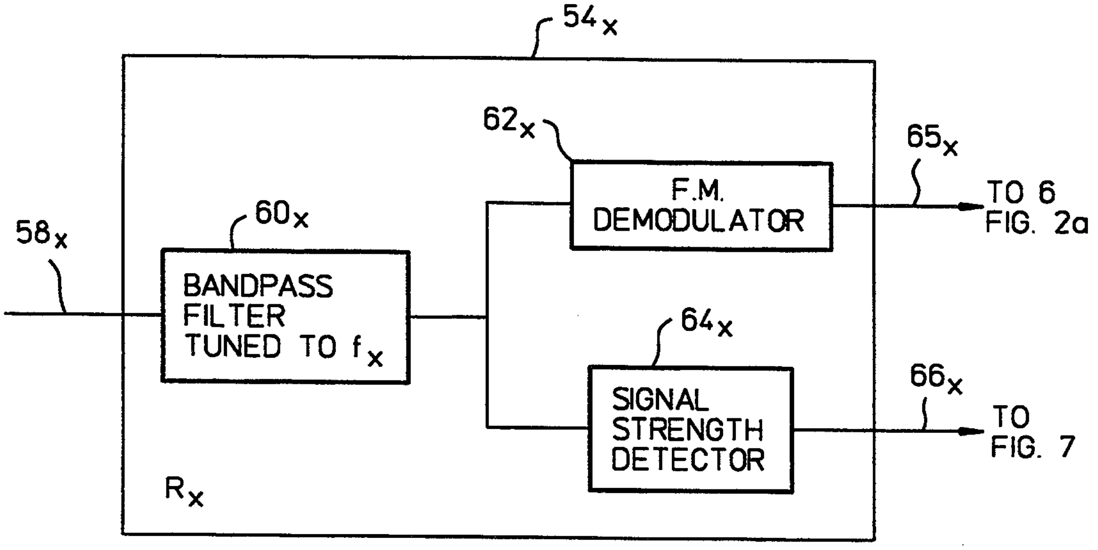

FIG. 6 is a block diagram of the receiver of FIG. 5.

Figure 7:
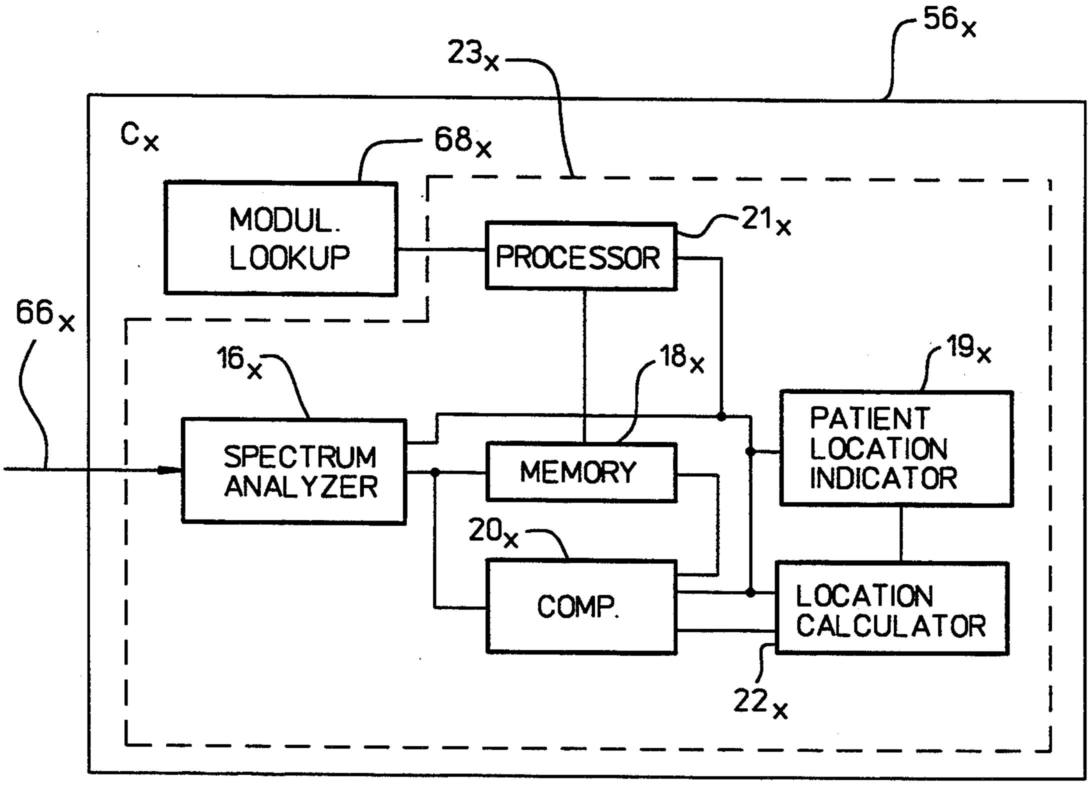

FIG. 7 is a block diagram of the correlator of FIG. 5.

DETAILED DESCRIPTION OF THE PREFERRED EMBODIMENT

Figure 1:
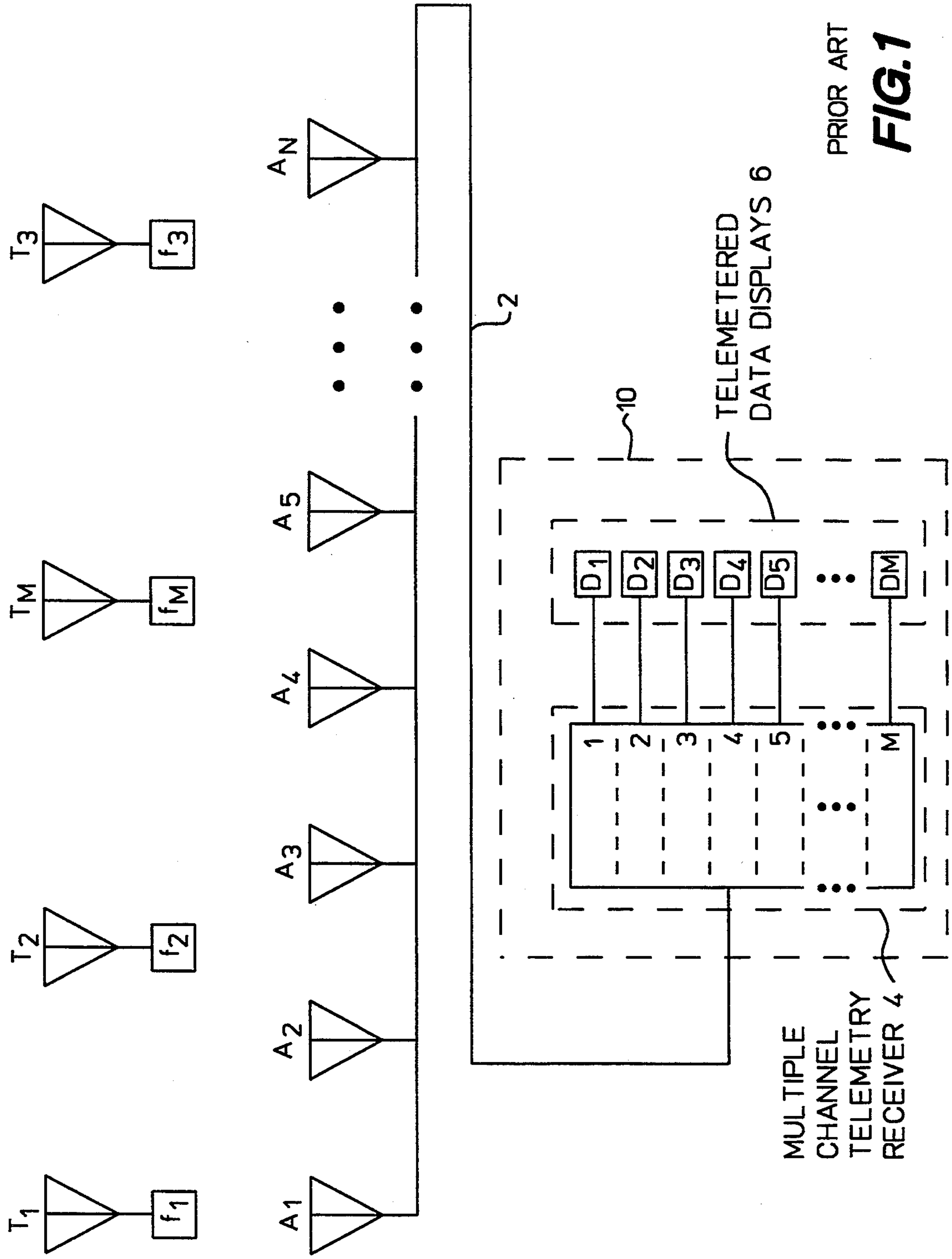
PRIOR ART FIG.1
FIG. 1 is a schematic representation of the patient monitoring systems of the prior art.

FIG. 1 illustrates the prior art patient monitoring telemetry systems. These systems typically include a number of transmitters ($T_1$, $T_2$, $T_3$ . . . $T_M$) that are attached to the monitored patients to transmit, for example, an ECG signal to a central monitor 10 at the nurse's station, with each of the transmitters operating at a different frequency, $f_1$, $f_2$, $f_3$, . . . $f_M$. The system also includes an antenna network wherein each of the antennas ($A_1$, $A_2$, $A_3$, $A_4$, $A_5$ . . . $A_N$) is in a fixed location within the monitored region in the hospital. Each of the antennas is interconnected to a single signal bus 2 resulting in the signals from each antenna being added to the signals from each of the other antennas, with that bus terminating at monitoring console 10. Within console 10, bus 2 applies the accumulated signals to a multiple channel receiver 4 which has M receiver sections with each receiver section having a bandwidth that has a one to one relationship with the bandwidth of the individual patient transmitters $T_1$, $T_2$, $T_3$ . . . $T_M$. Multiple channel receiver 4 separates the signals from each of the transmitters from each other by means of the limited bandwidth of each receiver section and then each of the signals is demodulated with the desired telemetered data signal applied to the corresponding one of displays 6 ($D_1$, $D_2$, $D_3$ . . . $D_M$) each of which corresponds with one of the individual patient transmitters.

While the different frequencies of the various transmitters allow the prior art telemetry monitoring system to identify the individual patient as the source, the location of the patient can not also be determined if the patient is mobile. That is true since there is not a fixed physical relationship between each transmitter and each antenna, and there is no way to determine which antenna is contributing the signal from any particular transmitter. Typically there will not be the same number of antennas as there are transmitters, thus the signal from each transmitter will be picked-up by more than one antenna. With the patient being mobile, the physical relationship between each transmitter and each antenna changes as the patient moves about the hospital.

In FIG. 1, patient 1 is nearest antenna $A_1$, patient 2 is intermediate (between) antennas $A_2$ and $A_3$, patient 3 is nearest antenna $A_N$, and patient M is intermediate (between) antennas $A_4$ and $A_5$, with the antenna(s) that the patient is/are closest to picking-up the strongest signal from the transmitter; however, other antennas that are farther away can also pick-up an attenuated signal from each transmitter. Because the signals from all of the antennas are added together by virtue of their being transmitted to console 10 on the same cable, without another variable in the system which could be used to determine which antenna, or antennas, is/are receiving the strongest signal from each of the transmitters, the patient can not also be located by the prior art patient monitoring systems.

Each of the embodiments of the present invention are based on the concept that, as a telemetry transmitter approaches a given receiving antenna, the signal strength received by that antenna from that transmitter increases. The basic idea is, accordingly, to continuously measure the signal strength from each transmitter at each antenna, and, by interpolating the averaged signal strength from the two or more antennas that receive the strongest signal from that transmitter, estimate the approximate position relative to those antennas where the patient is likely to be.

Clearly, the identity of each antenna and the signals received by it are required to determine the location of each monitored patient. The first requirement of each of the embodiments of the present invention is that each patient transmitter operates on a different frequency, and thus each patient is identifiable. The second requirement of each of the embodiments of the present invention is the ability to identify the individual antenna(s) that pick-up the strongest signals from each individual transmitter, keeping in mind that the same antenna(s) may be picking-up the strongest signals from more than one transmitter.

Figure 2A:
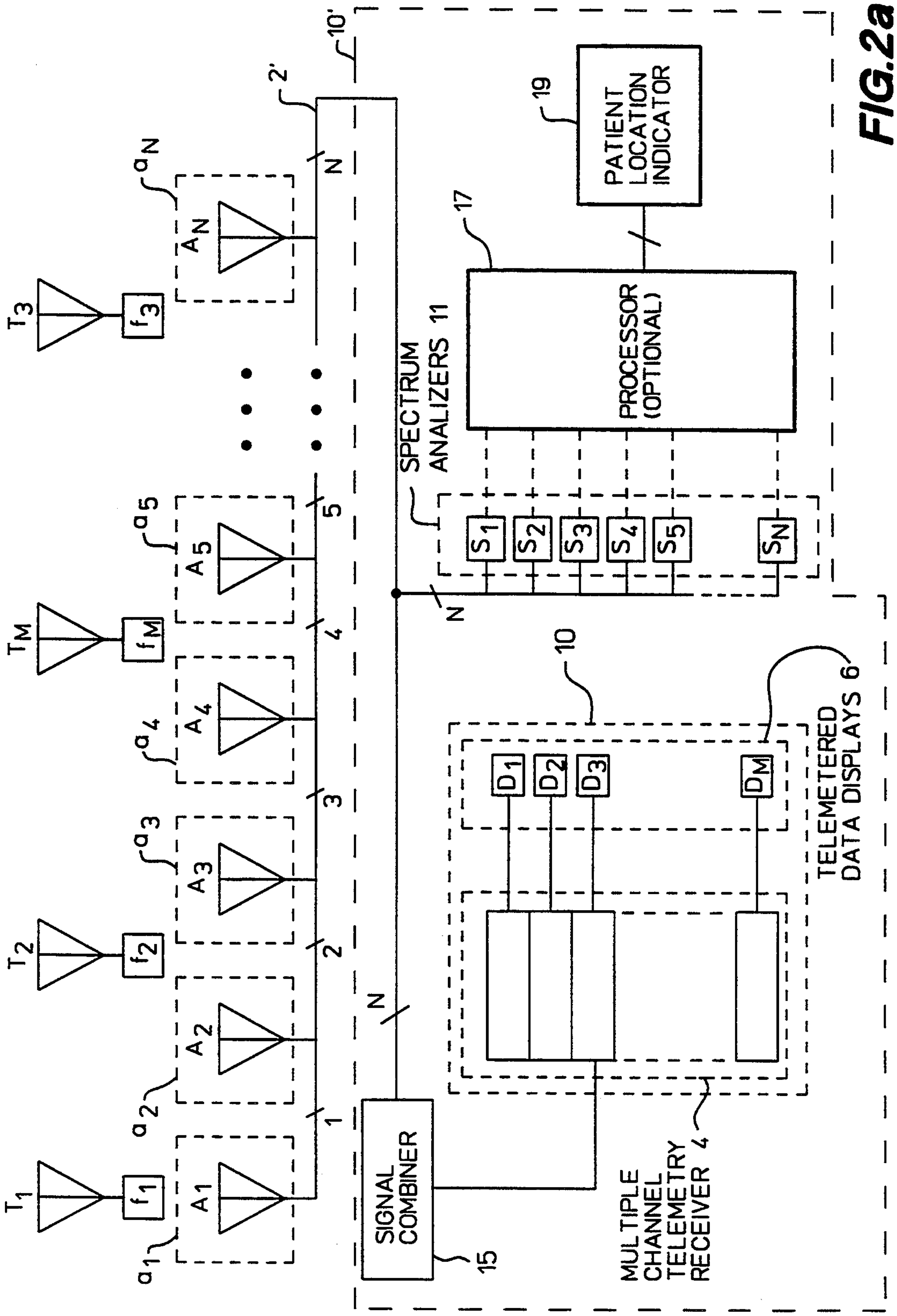

A first embodiment of the present invention is illustrated in FIG. 2*a*. This figure shows the same transmitter and antenna configuration as shown in FIG. 1, however, the antennas $A_1$-$A_N$, comprising receptors $A_1$-$A_N$, in this configuration are not interconnected with each other. Each antenna in this configuration is connected directly to console 10′ by means of its own coaxial cable in cable bundle 2′ so that the received signals from the various antennas are not mixed together. This is indicated in the figure with a "  " through the bus that appears to interconnect the antennas and a number that indicates the number of cables at that point in the bundle. Each antenna cable connects directly to two locations in console 10′: a telemetered data decoding section (shown on the lower left of the figure) and a patient location section (shown on the lower right of the figure).

The telemetered data decoding section includes a multiple channel receiver 4 and telemetered data displays 6, as in FIG. 1 which are preceded by a signal combiner 15. Signal combiner 15 adds the M signals from the individual transmitters together and applies them to the multiple channel telemetry receiver 4. Multiple channel telemetry receiver 4 and displays 6 function as in FIG. 1.

The patient location section includes at a minimum individual spectrum analyzers, $S_1$, $S_2$, $S_3$, $S_4$, $S_5$ . . . $S_N$, (11) each connected to a different one of the N cables in bundle 2′. Since each of the transmitters transmits at a different frequency, each spectrum analyzer will display a bar on the screen at each of the frequencies at which the corresponding antenna is receiving a signal with the height of each bar indicating the signal strength at the corresponding frequency.

With this system, the user at the nurse's station could look at each spectrum analyzer to determine which one, or ones, is/are receiving the strongest signal from the patient/transmitter of interest and from the spectrum analyzer displaying the greatest signal strength information for the patient/transmitter of interest, determine the approximate location of that patient since the location of the corresponding antenna is known. To simplify the operators job, the signal strength information from each spectrum analyzer could be applied to a processor 17 for signal strength comparison from each of the spectrum analyzer. Once the antenna(s) that is/are receiving the strongest signals from each of the patient transmitters is determined, the antenna's number could be used as an address to a look-up table that converts that antenna number to a physical location within the hospital since the location of each antenna and the layout of the hospital are fixed, one with respect to the other. The output of the look-up table for each of the individual patient transmitters can then be displayed on a patient location indictor 19. The patient location indicator 19 can take may possible forms: it could be a printer that prints out the location information, or it could be a CRT display, etc. Also, since there are some multipath reception problems in a hospital, as discussed below, the signals from a patient's transmitter may be temporarily lost. To overcome that problem, since patients are not moving quickly and can not make instantaneous jumps in location, processor 17 could also store the last several locations of a patient and do a time average if the location information is lost in any particular sample.

Figure 2B:
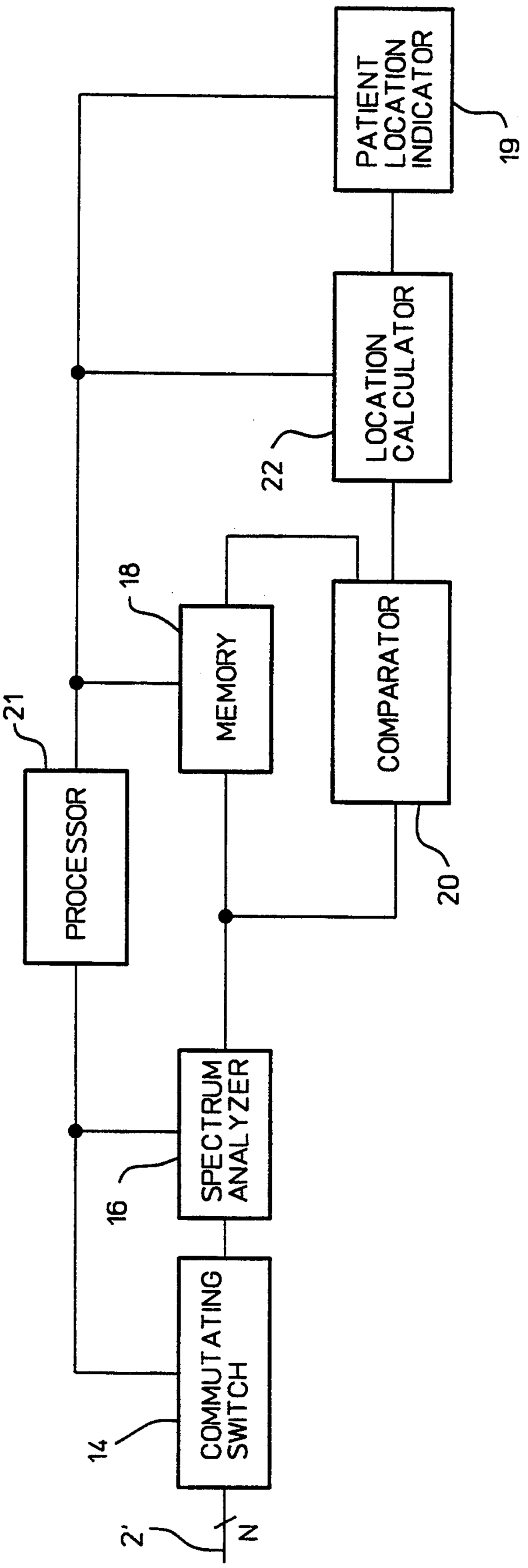

FIG. 2*b* illustrates a modification of the patient location section of console 10' of FIG. 2*a*. This modification as will be seen below eliminates the need for more than one spectrum analyzer. Here the spectrum analyzers $S_1$, $S_2, \ldots, S_N$ and processor 17 of FIG. 2*a* are replaced by a coaxial commutating switch 14 for selectively sampling the signals received from each of the antennas. The signals from switch 14 are then sequentially applied to spectrum analyzer 16 where the individual transmitter signal strengths are determined, then those measured signal strengths are stored in memory 18 together with information as to the source of those signals (which antenna). That can be done in several different ways, for example, the addresses of memory 18 could be divided so that particular memory locations are directly associated with a particular antenna, or an antenna number could be stored together with the individual signal strength information. The measured relative signal strengths are then compared with the corresponding transmitter signal strengths from each of the other antennas by comparator 20. Comparator 20 is shown receiving its input signals for comparison from either memory 18 alone, or a combination of memory 18 and spectrum analyzer 16. The source antenna information is retained with the strongest signals from each transmitter that are identified by comparator 20. That information from comparator 20 is then applied to a location calculator 22 where the antenna(s) number(s) that a particular patient is closest to is converted to a physical location within the hospital in terms of wing, floor, corridor and room number. That information is then applied to patient location indicator 19 as discussed above. Each of these elements are under the control of processor 21 to synchronize their performance. Additionally, as discussed above, processor 21 and location calculator 22 can also store several earlier location points for each patient and perform a time average to attempt to predict the location of a patient when a transmitted signal is momentarily interrupted.

In larger hospitals where there may be tens, maybe hundreds, of antennas in the telemetry system, the embodiment illustrated in FIGS. 2*a* and 2*b*, while workable, is unattractive simply because of the size of the bundle of cables and the commutator switch needed to implement them.

Figure 3A:
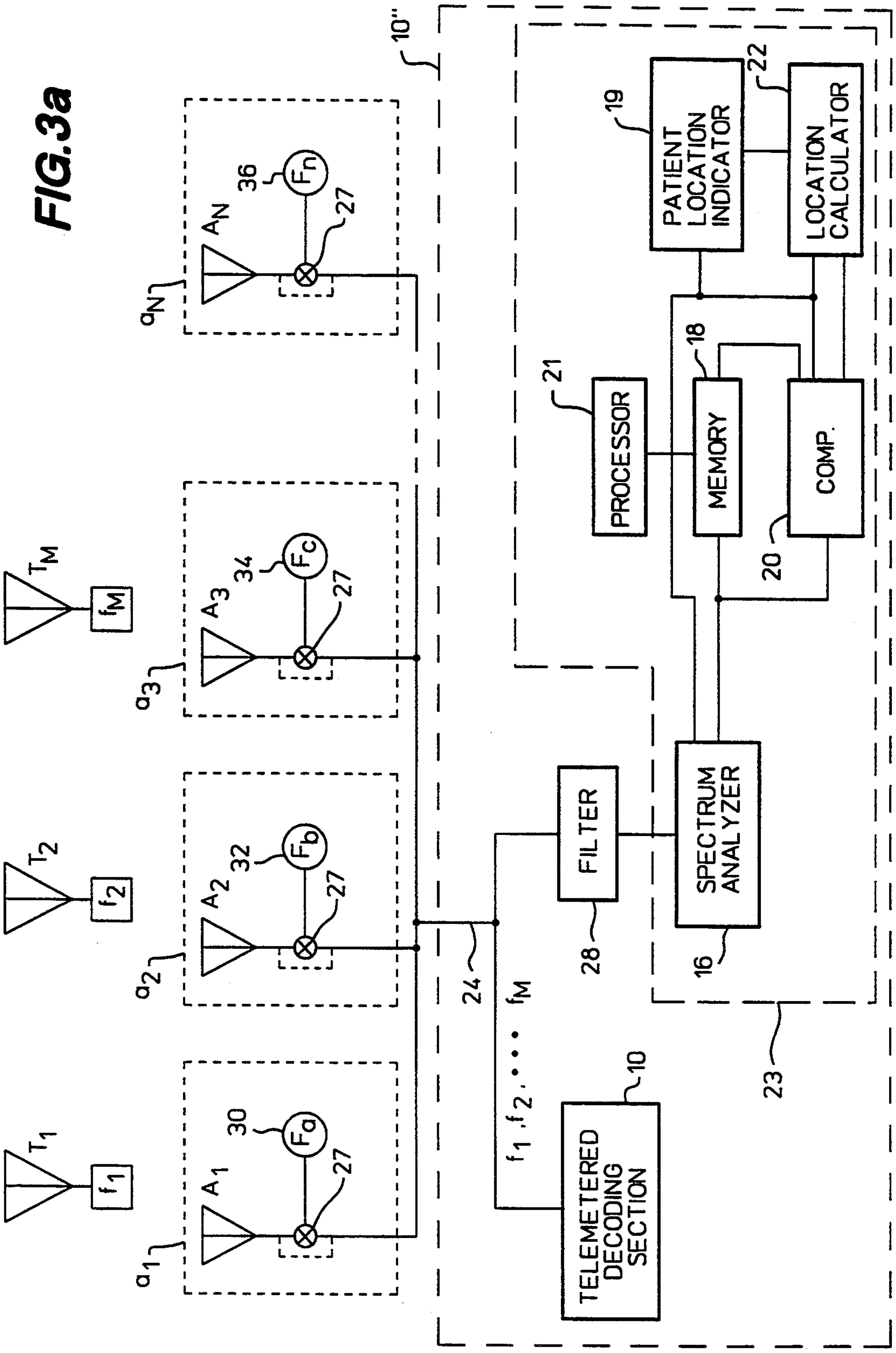

The second embodiment of the present invention is illustrated in FIG. 3*a*. Here there is shown a number of transmitters $T_1$, $T_2$ and $T_M$ which transmit at frequencies $f_1$, $f_2$ and $f_M$, respectively. There is also an array of fixed location receptors $a_1$-$a_N$ comprising antennas, $A_1$, $A_2$, $A_3 \ldots A_N$, each connected to a common coaxial bus 24 via a corresponding single balanced mixer 27. In each single balanced mixer 27, the main signal (e.g. the telemetered ECG signal) both passes through unchanged and is mixed with the local oscillator signal to produce both upper and lower side bands, with all three signals being applied to cable 24. Thus, the lower side-band is a downconversion of the main signal and the upper side-band is an upconversion of the main signal, each by the frequency of the corresponding local oscillator 30–36, with each of the local oscillators operating at a frequency $F_a$-$F_n$ different from each of the other local oscillators. At the nurse's station the console 10" includes two sections as discussed above with respect to FIG. 2*a*. At the lower left of FIG. 3*a* there is shown a telemetered decoding section 10 that is equivalent to the console 10 of the prior art of FIG. 1. Since bus 24 includes a combination from each of the N antennas of the telemetered signal and both upper and lower side bands of each of the signals from each of the patient transmitters, the individual receiver sections in multiple channel telemetry receiver 4 (FIG. 1) must be sharp enough to reject both of the upper and lower side band signals for the patient transmitter of interest, as well as the signals from each of the other patient transmitters. Given that, the operation of this section of the console 10" is the same as the operation of console 10 of FIG. 1.

The patient location section of this embodiment is similar to the embodiment of FIG. 2*b* with the commutating switch 14 replaced by a filter 28. As discussed above, the signal on bus 24 is the sum of all of the telemetered data signals and the upper and lower side bands of those signals from all of the receptors $a_1$-$a_n$. Since the antenna identification information is contained in both the up and down conversion signals (both of the side band signals), only one side band signal is needed in the patient location section. Filter 28 is included to remove the telemetered data signals and one of the side bands before processing to determine the position of each monitored patient. If the upper side band is to be used for that determination, then filter 28 is a high pass filter with a lower cut-off frequency that is between the highest transmitter frequency, $f_M$, and lower than the lowest up converted frequency, $f_1+f_a$. Similarly, if the down converted signal is to be used for patient location then filter 28 is a low pass filter having an upper cut-off frequency that is higher than the highest down converted frequency, $f_M$- $f_N$. Since the components necessary for transmission and processing of lower frequencies are typically less expensive and there are fewer radiation problems created by lower frequencies, the down converted signals are generally used.

As is well known, and often observed, the signal strength from one transmitter to one receiving antenna varies enormously because of obstructions, and particularly because of the standing waves caused by multipath propagation. Any system designed along the lines proposed would accordingly need to sample signal strengths from the transmitters sufficiently often for reasonable averaging.

It would also be possible for a transmitter to stand in the null of one antenna yet be at a point of reinforcement from a more distant antenna. With sufficiently frequent sampling of signal strength as the transmitter approached that point, it would be obvious where a particular transmitter was, since the patient would have traversed a rational route both in physical trajectory and in signal strength trajectory. That is, the patient could not instantaneously move from point to point. Furthermore, within a closed space, such as a hospital, the standing wave patterns caused by multipath propagation are generally not static because of the constant motion of people and equipment within the fields of the various antennas. Thus, temporal averaging of the measured signal strengths could likely be used even if the transmitter were stationary.

In a system such as that illustrated in FIG. 3*a* where the spacing between transmitter frequencies of 25 KHz, the bandwidth necessary can be calculated as follows:

$$BW=M\times N\times 25 \text{ KHz} \quad (1)$$

where M is the number of transmitters and N is the number of antennas. Thus, for a large system that has 200 transmitters and 300 antennas the necessary bandwidth is 1.5 GHz. While this type of a system is clearly viable, it may not be cost effective for a large installation because of the expense of the high frequency components that would be needed.

Figure 3B:
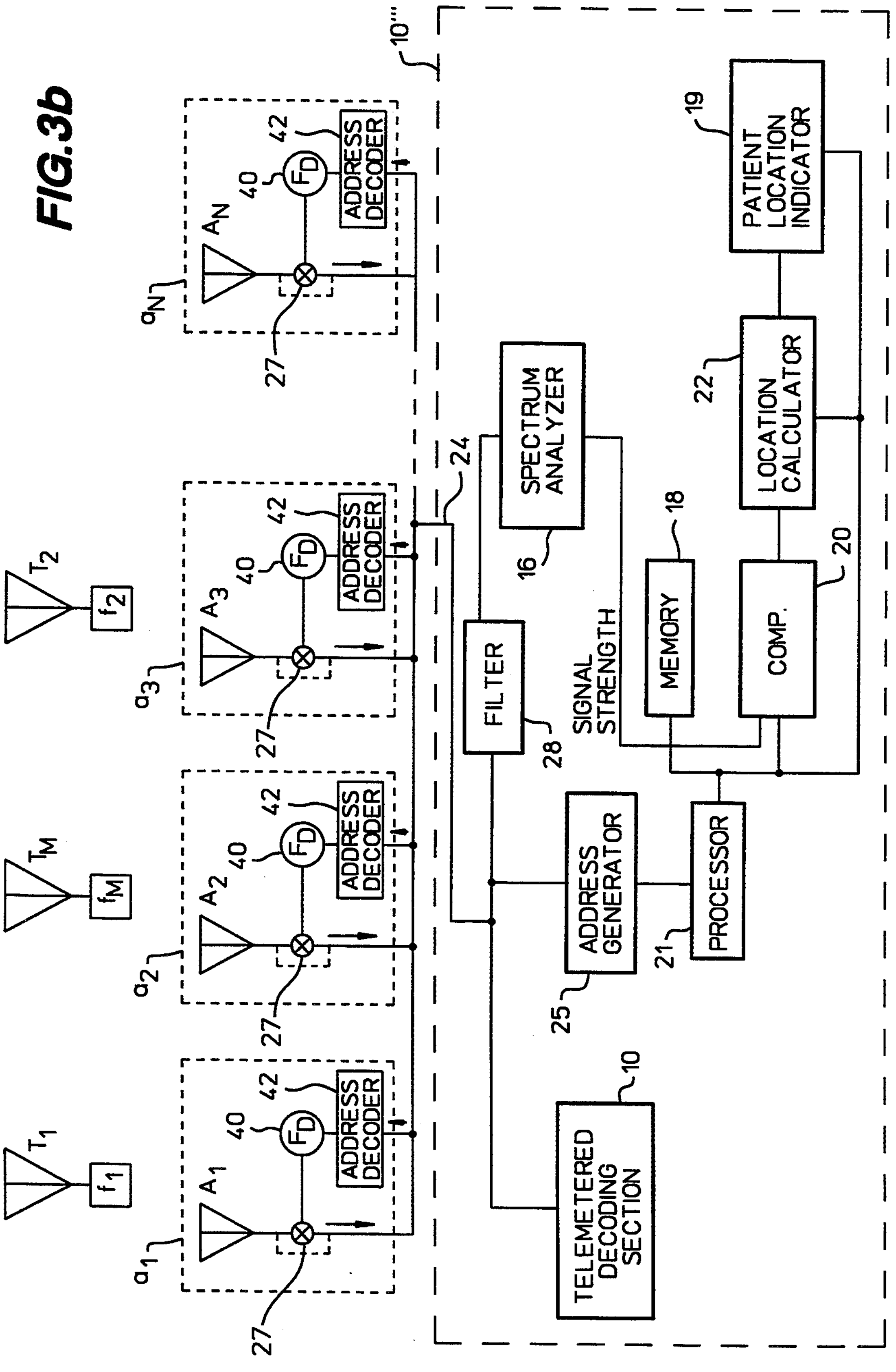

The third embodiment of the present invention shown in FIG. 3*b* provides a system that is useable in large installations without the need of a broad bandwidth. In this embodiment, the receptors $a_1, a_2, \ldots, a_n$ and the console 10''', are modifications of the second embodiment of FIG. 3*a* that was discussed above. In this embodiment local oscillators 40 associated with each antenna operate at the same frequency, $f_D$, as each other and are turned on and off in sequence as a function of time. Each local oscillator is turned on and off by it's corresponding address decoder 42, under the control of address generator 25 which in turn is controlled by processor 21. Address generator 25 can be implemented by a look-up table and each address decoder could be a comparator with one of the inputs being a signal that embodies the unique fixed code, or address, for turning the corresponding local oscillator on, and the second input would be the sequence of address signals generated by address generator 25. In addition, the various signal strengths stored in memory 18 would have to be keyed by processor 21 based on the time in the cycle so that each stored signal strength corresponds with the correct antenna. Thus, instead of using frequency to determine which antenna has received the signal of interest from the various transmitters, the time in the sequence of energizing the local oscillators is used to determine which antenna has received the signal of interest. In this configuration the required bandwidth is no longer a function of the number of antennas, it is only a function of the number of transmitters and the frequency separation between each of those frequencies. Thus for a system with 200 transmitters with 25 KHz separation between them, the necessary bandwidth is 5 MHz.

One way to turn the local oscillators on and off is to send a digitally encoded low frequency signal upstream from the receiving console to the local oscillator modules. This address code would merely be sequenced through all of the possible codes, each with the same duration, and the spectrum analyzer need only be synchronized with that code by processor 21 to identify which antenna is receiving the signal of interest. In a large system the coaxial bus in the antenna path normally also includes signal amplifiers at regularly spaced intervals to account for line loss and noise, and these amplifiers would have to be modified to provide a low frequency bypass around each of them to handle the upstream signals.

In operation the system would turn on a specific local oscillator, store the resultant downconverted spectrum, then compare that spectrum with the other spectra similarly gathered from the other antennas in the system as discussed in relation to FIGS. 2*b* and 3*a*. In this embodiment, the spectrum analyzer bandwidth would typically need to be no more than 10 MHz.

The cost to modify an existing prior art telemetry system need only be quite modest. Each antenna preamplifier would require a local oscillator and mixer and a low frequency circuit to decode the address sent upstream to turn on the local oscillator.

A fourth embodiment of the present invention is shown in FIG. 4 and it offers diversity reception, in addition to patient location. At each antenna receiving location there is a switched local oscillator 40 ($f_p$) each having the same frequency, and a continuously operating local oscillator 48–52 ($f_1$, $f_2$ and $f_3$).

In this embodiment, each local oscillator 40 ($f_p$) is turned on in sequence long enough for the received downconverted spectrum to be recorded for patient location signal strength comparisons, while oscillators 48–52 ($f_1$, $f_2$ and $f_3$) are on continuously. In general, two or three antennas receive the transmitted signal from any given patient monitoring transmitter with sufficient strength to be detected. Using those two or three signals, each having a different constantly operating local oscillator frequency, the timing of the switched local oscillator signals provide the gross location of the patient and the constant signals provide the diversity. Since individual transmitter signals are typically received by only two or three antennas with sufficient strength for reasonable detection, only two or three different frequencies are necessary for the continuously operating local oscillators if no two antennas with the same frequency are located immediately adjacent to each other.

Since the continuously operating local oscillators are not synchronized, a situation might arise where a low frequency beat note is generated in the console. If such a problem where encountered, a pilot signal could be sent upstream from the console to lock, or synchronize, the operation of local oscillators 48–52.

Certainly many other configurations are possible which use up- or down-conversion for patient location and diversity. For diversity, for example, two relatively closely spaced antennas at each receiving location could be used with only one being mixed up or down.

FIG. 5 illustrates a fifth embodiment of the patient location system of the present invention. This embodiment includes M patient transmitters ($T_1, T_2, \ldots T_M$) each operating at a different frequency ($f_1, f_2, \ldots f_M$) and an array of antennas ($A_1$, $A_2$, $A_3$ and $A_N$) located through out the hospital, as discussed above. Each of transmitters $T_x$ typically encode the patient monitored signals by frequency modulation. Each antenna ($A_1$, $A_2$, $A_3$ and $A_N$) in this system has a modulator ($M_1$, $M_2$, $M_3$ and $M_N$, respectively) associated therewith, which pairs together constitute receptors $a_1$-$a_n$, with each modulator modulating (e.g. amplitude modulation) the received signal of its associated antenna with a different pattern. In this embodiment, a console 10'''' includes M receivers 54$_x$ ($R_1, R_2, \ldots, R_M$) each of which is matched to the corresponding one of the patient transmitters $T_x$. Each receiver 54$_x$ includes the necessary circuitry to separate, by frequency, the signal from the corresponding patient transmitter $T_x$ from the composite signal on bus 58, and then to FM demodulate that signal to determine the telemetered data (e.g. ECG) from the corresponding patient while at the same time detecting the overall signal strength from the corresponding patient transmitter. The signal strength information from each receiver is then directed to the corresponding correlator $56_x$ ($C_1$, $C_2$, . . . $C_M$) where the strength of the different types of modulation from each of antennas $A_y$ is determined and compared to determine which modulation sources produce the strongest signals. Further, since the signals received by each antenna is modulated with a different pattern, the location of the corresponding patient transmitter with respect to the antennas can be determined from the strength of the modulation information. Further, since, as discussed above, the location of the antennas are fixed relative to the physical features of the hospital, the location of the patient relative to the antennas can also be translated to be relative to the physical characteristics of the hospital.

The modulation of each antenna may be very small, perhaps 1 db, with a different pattern for each antenna derived from a pseudo random sequence so that no two of the patterns correlate with each other to avoid misidentification of any of the antennas. Since patients are not moving about the hospital very fast, data collection for patient location can be done over several seconds before identifying the location of a patient. That then provides correlators $56_x$ with several data samples to identify which antennas are receiving the strongest signals from each transmitter. Further, since the antenna locations are fixed and the patients can only traverse the halls, stairs and elevators of the hospital in a fixed number of paths, correlators $56_x$ could also have available to them information as to the possible paths between the various antennas to further eliminate the possible misidentification of the current location of the patient by considering the previous location of the patient and the possible paths that can be taken from that location to a new location.

Modulators $M_1$ - $M_N$ of FIG. 5 can be implemented in several different ways. One approach might be to use a switch in series with each antenna with that switch being turned on and off with a different selected pattern for each modulator. Alternatively, each modulator could be a small attenuator which can be controlled from correlator 56 to turn it on and off sequentially in time as were local oscillators 40 in the system of FIG. 3*b*. Yet another possible approach is to have attenuators for each of the modulators and the modulators each generating a modulation signal that is orthogonal to others of the modulating signals.

FIG. 6 illustrates one of the set of M receivers $54_x$ with single line bus 58 connected to a bandpass filter $60_x$ with a center frequency that matches the frequency of patient transmitter $T_x$ and with a bandwidth that is narrow enough to reject the signals from each of the other patient transmitters. The output of filter $60_x$ is then applied to FM demodulator $62_X$ and a signal strength detector $64_x$. Demodulators $62_x$ then demodulate the telemetered data from the signal from filter $60_x$ and then passes the resulting signal on line $65_x$ to a display 6 such as discussed in relation to FIG. 1. Since location is not necessary to determining what the telemetered data includes, it is not important to know which antenna(s) are receiving the data, thus the AM modulations on the composite signal from filter $60_x$ is ignored. Thus, any of the FM modulated frequency signals from the corresponding patient transmitter is all that is necessary so long as it is of sufficient signal strength to be detected reliably. For patient location information the output from filter $60_x$ is processed so as to not lose the AM modulation information. A signal strength detector $64_x$, which does strength from filter $60_X$ which is applied to the not discriminate between the various modulation patterns, is used to continuously determine the overall signal strength from filter $60_x$ which is applied to the corresponding correlator $56_x$ on line $66_x$ (see FIG. 7).

FIG. 7 presents a block diagram of correlator $56_x$ which includes a module like the patient location module 23 of FIG. 3*a*, with the addition of a modulation look-up table $68_x$ which is connected to processor $21_x$ of module $23_x$. In this application spectrum analyzer $16_x$ of module $23_x$ measures the spectra of the various AM modulation signals contained in the composite signal strength signal from receiver $54_x$. Modulation look-up table $68_x$ is then used to identify the antenna source of each modulation pattern detected by spectrum analyzer $16_x$ which is stored in memory $18_x$ (now shown) together with the corresponding signal strength from spectrum analyzer $16_x$. Thus, correlator $56_x$ operates similarly to the patient location section of the second embodiment in FIG. 3*a* by using unique modulation signals instead of difference frequencies to identify the particular source antenna(s) of the strongest signals. The identified patient location is then provided by patient location indicator 19 as discussed above with relation to FIG. 3*a*.

While in the last embodiment the receiver and correlators where discussed as being individual units which are matched to individual patient transmitters, and they could indeed be provided to a hospital in such a manner, an overall integrated system could alternatively be provided wherein a single receiver-correlator unit with a multiple channel front end (M receivers $54_x$) could be provided with a single correlator section that employs a sampling spectrum analyzer.

In describing the present invention, reference has been made to several preferred embodiments and illustrative advantages of the present invention. Those skilled in the art, however, may recognize additions, deletions, modifications, substitutions and other changes which will fall within the purview of the present invention. For example, each of the embodiments of the present invention, those that have been disclosed and any other that operates in a similar fashion, could be implemented using a microprocessor and supporting components to achieve the same results. Therefore, the scope of the present invention is not limited to only those embodiments disclosed herein, but can only be determined by reviewing the appended claims.

What is claimed is:

1. A telemetered patient location system for use in a medical treatment facility having patients comprising:

M patient transmitters, wherein each patient transmitter attaches to one of the patients and sends a patient information signal having a unique patient transmitter attribute;

a distributed receiver including N receptors positioned at different fixed locations, each receptor receiving the patient information signals and incorporating a corresponding unique receptor signature at an intensity into each of the received patient information signals, the intensity reflecting a corresponding patient's distance to the respective receptor, and the distributed receiver generates a single composite signal from the received patient information signals, which have incorporated receptor signatures;

separating means for separating the single composite signal according to the unique patient transmitter attributes into M patient attribute signals each containing at least one of the N receptor signatures at its associated intensity;

measuring means for measuring the intensities of the N receptor signatures contained within each of the M patient attribute signals; and processing means for comparing the measured receptor signature intensities, for selecting a dominant receptor signature corresponding to the greatest intensity for each of the M patient attribute signals, each dominant receptor signature indicating which receptor each patient is nearest.

2. A telemetered patient location system as in claim 1 wherein the distributed receiver further includes:

N single balanced mixer means, each of the N single balanced mixer means being connected with a corresponding one of said N receptors;

N local oscillators, each of the N local oscillators having the same frequency and each being connected to a corresponding one of said N single balanced mixers;

N address coding means, each of the N address coding means having a different address associated with a corresponding oscillator, each of the N address coding means connected to a corresponding one of said N local oscillators;

single bus means, for receiving the patient information signals and for combining the received patient information signals, which have incorporated receptor signatures, into the single composite signal; and address generator means, connected to said single bus means, for sequentially generating the N receptor signatures in each of the received patient information signals by sequentially turning on and off each of the oscillators using the corresponding associated address.

3. A telemetered patient location system as in claim 2 wherein:

said measuring means includes a spectrum analyzer connected to said single bus means for measuring varying strengths of the received patient information signals; and said processing means includes:

control means, connected to said address generator means, for coordinating the combining of each of the received patient information signals, which have incorporated receptor signatures to maintain the identity of the receptor signatures;

memory means connected to the control means for storing the measured intensity of at least one of the dominant receptor signatures within each of the patient attribute signals.

4. A telemetered patient location system as recited in claim 1, each of the M patient transmitters including a unique frequency which corresponds to the patient attribute, wherein the patient transmitter transmits the corresponding patient information signal at the unique frequency.

5. A telemetered patient location system as in claim 4 wherein:

the separating means includes N individual cables, each cable connected between a corresponding one of the N receptors and the measuring means; and said measuring means includes N spectrum analyzers, each spectrum analyzer connected individually to a corresponding one of said N individual cables.

6. A telemetered patient location system as in claim 4 wherein:

the separating means includes N individual cables, each cable connected between a corresponding one of the N receptors and the measuring means;

said measuring means includes:

commutating switch means for sequentially switching between said N individual cables; and a spectrum analyzer, connected to said commutating switch means, for sequentially measuring the intensity of each of the N receptor signatures within each of the patient information frequencies in the composite signal; and said processing means includes:

memory means for storing the measured intensity of at least one of the dominant receptor signatures associated with each of the M patient information signals.

7. A telemetered patient location system as in claim 4 wherein: the distributed receiver further includes:

N local oscillators, each oscillator having a different frequency,

N single balanced mixer means, each of the N single balanced mixer means being connected with the corresponding receptor and the corresponding oscillator, for producing the receptor signatures by mixing sidebands at the corresponding local oscillator frequencies into the received patient information signals, wherein the sidebands at each of the local oscillator frequencies corresponds to the receptor signatures, and the system further includes single bus means, for receiving the patient information signals and for combining the received patient information signals, which have incorporated receptor signatures into the single composite signal.

8. A telemetered patient location system as in claim 7 wherein:

said measuring means includes a spectrum analyzer connected to said single bus means for measuring the intensity of the N receptor signatures within each of the M patient attribute signals such that the intensity of the sidebands indicates which of the receptors the patient is near; and said processor means includes memory means for storing the measured strength of at least one of the dominant receptor signatures associated with each of the M patient attribute signals.

9. A telemetered patient location system as recited in claim 4, in which the distributed receiver further comprises:

N modulators, each having a different modulation pattern, wherein each modulation pattern is one of the N receptor signatures, each of the N modulators is connected to a corresponding receptor for modulating the strength of the corresponding received patient information signals by the respective modulation pattern; and single bus means for receiving the patient information signals, which have incorporated receptor signatures, and for combining the patient information signals into the combined signal.

10. A telemetered patient location system as in claim 9 said separating means comprises:

M bandpass filter means, one for each of the M patient transmitters; and wherein each filter means is tuned to a different center frequency that matches a corresponding transmitting frequency of the corresponding patient transmitter and has a bandwidth that is sufficiently narrow to reject the signals transmitted by each of said M patient transmitters to which said filter means does not correspond.

11. A telemetered patient location system as in claim 9 wherein said processing means further includes spectrum analyzer means for determining which of the N receptor signatures are present and their relative strength in each of the M patient attribute signals.

12. A telemetered patient location system as in claim 11 wherein said processing means further includes:

memory means for storing the measured strengths of at least one of the dominant receptor signatures associated with each of the M patient attribute signals; and look-up means for correlating by amplitude said strongest modulation patterns with said corresponding one of said N receptor signatures such that the amplitude of the modulation pattern indicates which one of the receptors the patient is near.

13. A telemetered patient location method for use in a medical treatment facility having M patients, and including M patient transmitters and a distributed receiver including N receptors at different fixed locations, wherein:

each of the M patient transmitters is attachable to one of the patients and transmits a patient information signal having a unique patient transmitter attribute, each of the N receptors receives patient information signals and incorporates a corresponding unique receptor signature at an intensity into each received patient information signal such that each of the M patient information signals is adjusted by at least one of the N receptor signatures, the intensity reflecting a corresponding patient's distance to the respective receptor, and the distributed receiver generates a single composite signal from the received patient information signals, which have incorporated receptor signatures;

said method comprising the steps of:

applying at least one of the N receptor signatures to each of the received patient information signals;

separating the single composite signal according to the unique patient transmitter attributes into the M patient information signals, each of the M patient information signals containing at least one of the N receptor signatures;

measuring the intensity of each of the receptor signatures contained within each of the M patient information signals; and comparing the measured intensity of each of the receptor signatures for each of the M patient information signals such that a dominant receptor signature is determined for each of the M patient information signals, each dominant receptor signature indicating which receptor each patient is near.

14. A telemetered patient location method for use in a hospital environment, as recited in claim 13, said step of applying the N receptor signatures to the received patient information signals further comprising the steps of:

producing N receptor signatures by modulating the intensity of each of said N receptors by a different modulation pattern; and separating the M signals received by said N receptors from said M patient transmitters, each of said separated signals being a patient attribute signal having a single frequency from each of said N antennas with each component form each of said antennas having a different modulation pattern thereon.

* * * * *